United States Patent

Houska et al.

[11] 3,923,232
[45] Dec. 2, 1975

[54] METHOD OF BONDING RECO$_5$ MAGNETS, APPARATUS FOR EFFECTING THE METHOD AND PERMANENT MAGNETS PRODUCED BY THE METHOD

[75] Inventors: Jaroslaw Houska, Niederrohrdrof; Jan Strejcek, Turgi, both of Switzerland

[73] Assignee: BBC Brown Boveri & Company Limited, Baden, Switzerland

[22] Filed: June 20, 1974

[21] Appl. No.: 481,185

[30] Foreign Application Priority Data
June 29, 1973 Sweden.............................. 739489

[52] U.S. Cl. ............... 228/221; 228/251; 228/263; 29/608; 29/609
[51] Int. Cl.$^2$......................................... B23K 1/04
[58] Field of Search ............ 29/607, 608, 609, 494, 29/504

[56] References Cited
UNITED STATES PATENTS
2,500,748  3/1950  Grant................................ 29/607 X
3,188,732  6/1965  Feduska et al...................... 29/504
3,271,718  9/1966  Shaw.................................. 29/608 X
3,284,891  11/1966  Whitney............................. 29/501 X
3,417,461  12/1968  Wells et al........................ 29/501 X
3,678,570  7/1972  Pavlonis et al..................... 29/504

Primary Examiner—Donald G. Kelly
Assistant Examiner—K. J. Ramsey
Attorney, Agent, or Firm—Oblon, Fisher, Spivak, McClelland & Maier

[57] ABSTRACT

Complex shaped permanent magnets are formed by braze bonding together at least two simpler shaped permanent magnets by applying a layer of a solder between the surfaces of said shaped permanent magnets intended to be joined, and heating the assembly to a temperature sufficient to cause melting of the solder, wherein said heating is effected in a non-oxidizing atmosphere.

10 Claims, 2 Drawing Figures

3,923,232

METHOD OF BONDING RECo₅ MAGNETS, APPARATUS FOR EFFECTING THE METHOD AND PERMANENT MAGNETS PRODUCED BY THE METHOD

BACKGROUND OF THE INVENTION

1. Field of the Invention:

This invention concerns a method of braze bonding at least two $RECo_5$ permanent magnets provided with soldering surfaces, RE denoting a rare-earth metal or a mixture of rare-earth metals as defined below, apparatus for effecting the method and permanent magnets produced by this method.

2. Description of the Prior Art:

Compounds of cobalt and rare-earth metals, or mixtures of rare-earth metals, in powder form have become very important in the manufacture of permanent magnets because they exhibit an unusually high coercive field strength (cf. Sci. Am. Dec. 1970, P. 92 ff). Sintered permanent magnets having outstanding magnetic properties are made from these powdered compounds by a variety of methods (cf. DT-OS No. 2 059 301 and DT-OS No. 2 121 514). Before sintering, these powdered compounds are placed in a mould, aligned in a strong magnetic field, and then compressed.

Uniform alignment of the magnetic powder in complicated moulds, of horseshoe shape for example, is not possible without extensive technological means, since external homogeneous magnetic fields must first be created by suitable devices in accordance with the desired direction of magnetization. In addition, a special mould is expensive and therefore unprofitable for small production batches. Mechanical working of the sintered magnet material with the aim of obtaining the desired complex shape from a simple shape is also not to be recommended because the sintered magnet material is very hard and brittle, and therefore difficult to work.

For these reasons it is necessary to assemble permanent magnets of complex shape from smaller permanent magnets. However, joining such permanent magnets together satisfactorily is extremely difficult because the joints are subject to mechanical loading at temperatures above 200°C (e.g., in the case of travelling-wave tubes for generating microwaves) and also the magnetic properties of the initial material must not be reduced.

Attempts by the applicant to solve these problems by means of the soldering methods normally employed for joining metals (cf. Werkstattbucher, published by H. Haake, no. 28, R. v. Linde: Loten, 4th edition, Springer 1954) have not been very successful.

In the case of soft soldering, for example, active fluxes have been used which react with the magnet material and after soldering, severely reduce the strength of the joints and the coercive field strength of the permanent magnet. Completely removing flux residues is extremely difficult with the porous, sintered magnet materials, and as a result soft-soldered $RECo_5$ permanent magnets are subject to corrosion.

SUMMARY OF THE INVENTION

Accordingly, one object of the invention is to create a bond between $RECo_5$ permanent magnets which, while retaining the magnetic properties of the initial materials, yields a corrosion-resistant $RECo_5$ permanent magnet which can also be mechanically loaded at high temperatures.

This object is achieved in that a layer of solder is first applied to the soldering surfaces and the permanent magnets are then brazed in a protective-gas furnace.

BRIEF DESCRIPTION OF THE DRAWINGS

The invention will be explained in more detail with reference to the drawings, in which.

Figure 1:
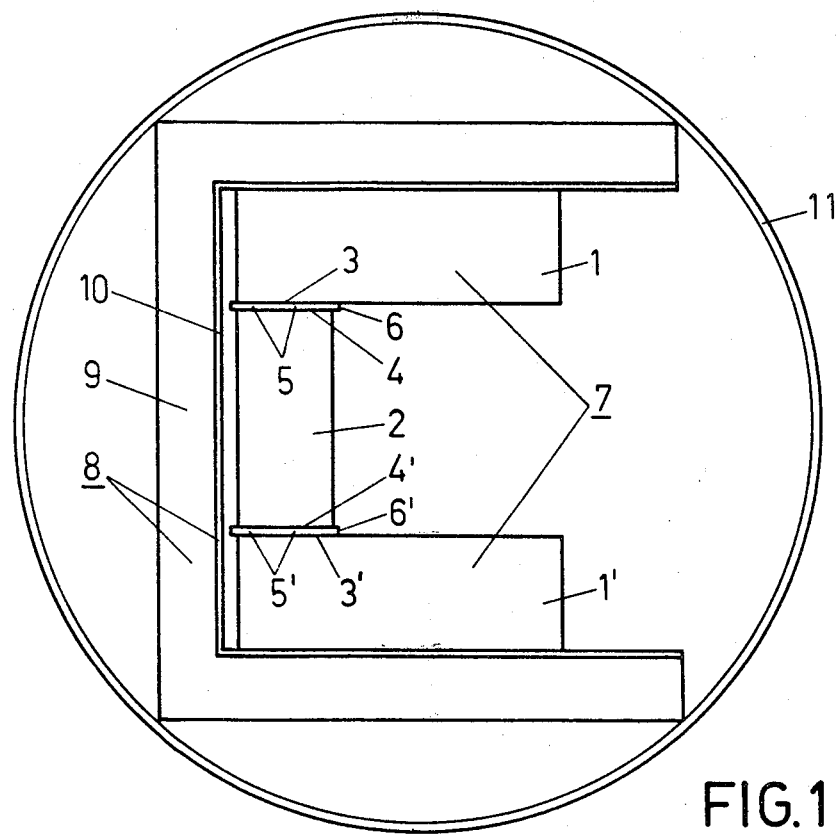
FIG. 1 shows a section through a workpiece enclosed in a tantalum crucible and fixed prior to soldering.

DETAILED DESCRIPTION OF THE PREFERRED EMBODIMENTS $RECo_5$ permanent magnets soldered by the method of the invention not only retain their magnetic properties, but are also so firmly bonded together that when subjected to mechanical stress, in shear for example, the composite permanent magnet will not break at the soldered joint, but usually at a point within the original sintered $RECo_5$ permanent magnet, even at temperatures of about 200°C. No corrosive residue occur. Thin oxide films covering the soldering surfaces do not have to be reduced in order to achieve a strong bond, and an oxide layer of up to a film thickness of several $\mu$ can be incorporated in the soldered joint without any harmful effect on the properties of the permanent magnet.

When carrying out the method of the invention, it is recommended that the layers of solder should consist of solder foil between 10 and 50$\mu$ in thickness, of silver, copper or another hard solder material. In particular it is advisable to allow the solder foil to project a few millimeters beyond the edges of the gap formed by the soldering surfaces, as in this way the solder fills the gap particularly well.

In an especially advantageous version of the invention the workpiece to be produced from the permanent magnets and the solder layers is fixed in a holder. The workpiece and holder are enclosed in a gas-permeable crucible, and the crucible containing the workpiece is introduced into a cooling zone of a protective-gas furnace. The crucible is passed into a heating zone of the furnace which is heated to no more than the melting temperature of the solder foil, and on completion of the soldering process, the crucible is cooled in the cooling zone of the furnace. In particular, the soldering process should take place under vacuum or in a protective gas atmosphere, e.g. helium or argon. In contrast to normal protective-gas furnaces, the gas atmosphere in this case does not have to reduce metal oxides so as to produce bare soldering surfaces, but chiefly serves the purpose of preventing further oxidation by keeping out oxygen. This is aided by the fact that the holder comprises a steel frame with a tantalum layer, and the crucible is of tantalum.

Referring now to the drawings in which like reference numbers in the description refer to corresponding like reference numbers in the drawings:

In FIG. 1, the 1, 1' and 2 denote three $SmCo_5$ permanent magnets having soldering surfaces 3, 3' and 4,4'. Soldering surfaces 3, 4 and 3', 4' form gaps 5 and 5' in which the solder foils 6 and 6' are located. The magnetic workpiece 7 is fixed in holder 8 which consists of a steel frame 9 and a tantalum layer 10. Workpiece 7 and holder 8 are contained in a tantalum crucible 11.

Figure 2:
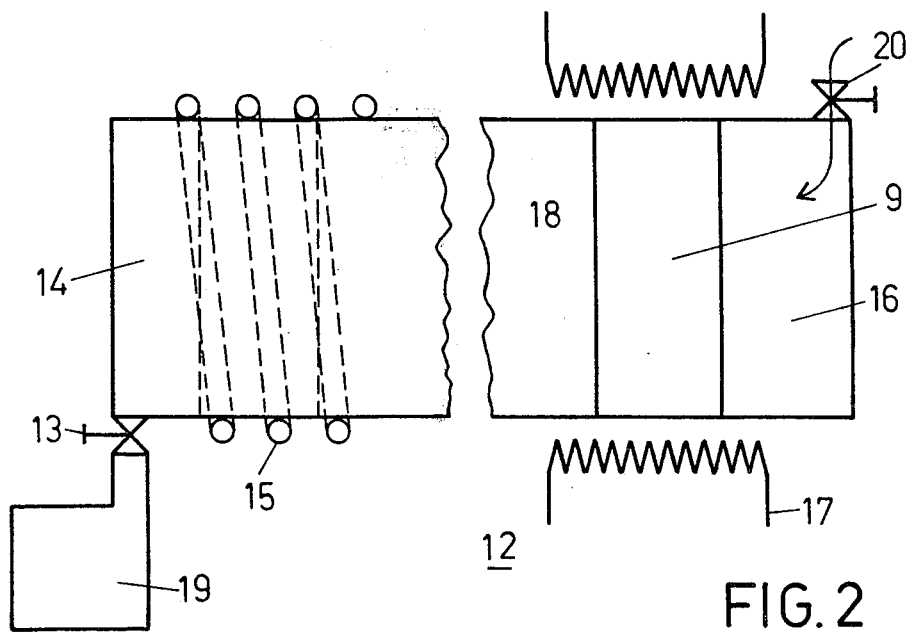
FIG. 2 shows a section through a sintering furnace in which the soldering process takes place.

In FIG. 2, identical parts are identified by the same reference numbers as in FIG. 1. In addition, 12 denotes a sintering furnace having a cooling zone 14 with cooling coils 15 and also a heating zone 16 with heating element 17. The number 18 denotes a protective-gas, 19 a vacuum pump, while 20 and 13 are valves.

To make the method of the invention to carry out, the brazing surfaces 3 3' and 4, 4' of the $SmCo_5$ permanent magnets 1, 1' and 2 to be soldered are first ground flat, e.g. with a polishing wheel, and then washed with a solvent, such as ethanol. The permanent magnets are then assembled with hard solder foils 6, 6' which can be of a silver or copper, inserted at the soldering surfaces 3, 3' and 4, 4', and then fixed in a holder 8 so that the solder foils 6 and 6' are pressed against soldering surfaces 3, 4 and 3', 4' by the weight of the magnets above them. The solder foils 6, 6' are of such a size that they project a few millimeters from the edges of the gaps 5, 5' formed by the soldering surfaces 3, 4 and 3', 4'. To prevent chemical reaction between the $SmCo_5$ permanent magnets 1, 1' and 2 and the steel frame 9, the latter is covered with a layer of chemically inert tantalum 10.

The holder 8 and the magnetic workpiece 7 are enclosed in the gas-permeable tantalum crucible 11 and introduced into the cooling zone 14 of the sintering furnace 12. Sintering furnace 12 is closed with an air-tight seal and evacuated with a pump 19. To continue the procedure it can either be left under vacuum or be filled by way of valve 20 with a protective gas, e.g. argon or helium. The heating zone 16 is heated to a temperature corresponding to the material composition of the solder foils 6, 6' used, this temperature being roughly equal to the melting temperature of the solder foils 6, 6', i.e. approx. 1075°C for copper and approx. 960°C for silver.

The brazing process commences when the tantalum crucible 11 containing the workpiece 7 has been introduced into the heating zone 16. Normally the brazing process is completed after approximately 10 minutes. The brazing time can be made considerably longer or shorter, however, depending on the temperature of the heating zone, dimensions of the workpiece and the material of the solder foil.

The brazing process is ended by quickly transferring the tantalum crucible 11 containing the workpiece 7 from the heating zone 16 into the cooling zone 14. The associated rapid cooling of the magnet material 1, 1' and 2 is very important because if cooling is slow, in the vicinity of the curie temperature of 710°C a solid-state reaction causes the $SmCo_5$ phase, which is responsible for the good magnetic properties, to change gradually into the non-hard-magnetic phases $Sm_2Co_7$ and $Sm_2Co_{17}$, thus seriously impairing the magnetic properties of workpiece 7. If the workpiece 7 is cooled quickly, however, the undesirable solid-state reaction is almost completely suppressed and the $SmCo_5$ is retained.

Having been brazed, the worpiece 7 exhibits the same magnetic properties as the permanent magnets 1, 1' and 2. The strength of the joint is such that when mechanical stresses are applied, and in particular at elevated temperatures, it is not the joint, but the permanent magnets 1, 1' or 2 which break. According to metallurgical examination of micrographs of hard-soldered $SmCo_5$ permanent magnets, this surprising result is very probably due to the fact that in the boundary area of a solder foil and the surrounding $SmCo_5$ permanent magnets an alloy forms, e.g. an alloy of CuCoSm or AgCoSm, which is liquid at the soldering temperature and which is able to penetrate relatively quickly and deeply into the pores of the $SmCo_5$ permanent magnets (obtained by a sintering process) and give rise to further alloy formation. A strong bonding layer is then formed when the workpiece 7 cools down. Solder foils of more than $50\mu$ or less than $10\mu$ in thickness are found to be unsuitable for the method of the invention.

The method is not restricted only to $SmCo_5$ permanent magnets. It can also be applied to other $RECo_5$ permanent magnets, in particular to those for which RE denotes mixtures of rare-earth metals, (La, Ce, Pr, Nd, Sm, Eu, Gd, Tb, Dy, Ho, Er, Tm, Yb, Lu), Y and Sc and mixtures thereof and alloys thereof such as Y-misch metal, Ce-misch metal $Pr_{.5} Sm_{.5}$, $La_{0.5}Sm_{0.5}$, $Ce_{0.5} Sm_{0.5}$, $MMo_{.5}Sm_{0.5}$ the last four alloys known from D. C. Martin and M. G. Benz in "Cobalt-Rare Earth Permanent Magnetic Alloys", Report No. 70-C-261, August 1970, General Electric, Schenectady, New York. Other alloys satisfying the formula RE are $Gd_x Nd_{1-x}$, $Dy_x Pr_{1-x}$, $Dy_x Nd_{1-x}$, $Gd_x Dy_{1-x}$, $Gd_x Ho_{1-x}$, $0 < X < 1$, known from Wallace, Hopkins, Lehmann, J. of Solid State Chemistry 1, 39–44 (1969). The method can also be employed with heating-zone temperatures which are 100°C below the melting temperature of the hard-solder foil.

Other hard solders, in particular vacuum-type hard solders, can be used instead of copper or silver foils. For instance good results are attainable with such solder metals as Au and Pt, which can be used with the Cu or Ag or can be used above.

For instance good results are attainable with such alloys as:

| Alloy | Preferred composition | Melting Point resp. melting region (°C) |
|---|---|---|
| Pt/Sn | 71/29 | 1072 |
| Ag/Au | 60/40 | 990–1005 |
| Cu/Au | 80/20 | 990–1040 |
| Au/Ni | 70/30 | 970–1040 |
| Cu/Mn/Ni | 30/40/30 | 980–1000 |
| Cu/Zn | 80/20 | 980–1000 |
| Cu/Ti | 90/10 | 900–1000 |
| Cu/Si | 96/4 | 915–1000 |
| Cu/Au/Ni | 30/60/10 | 995 |
| Cu/Mn | 80/20 | 900–925 |

Protective-gas furnaces can be used instead of sintering furnaces. It is also possible, by means of a suitable device, to vary the force applied to the solder foils, which in the method of the invention is determined by the inherent weight of the permanent magnets, and in this way to influence the brazing process.

Having now fully described this invention, it will be apparent to one of ordinary skill in the art that many changes and modifications can be made thereto without departing from the spirit or scope of the invention as set forth herein.

What is claimed as new and desired to be secured by letters patent of the United States is:

1. A method of braze bonding together at least two shaped permanent magnets wherein said shaped permanent magnets are formed of an alloy of the formula $RECo_5$ wherein RE is at least one metal selected from the group consisting of rare-earth metals, alloys thereof and misch metal, which comprises: applying a solder foil of a thickness of $10\mu$ to $50\mu$ between the surfaces of said shaped permanent magnets intended to be joined, and heating said assembly to a temperature sufficient to cause melting of said solder, wherein said heating is effected in a non-oxidizing atmosphere.

2. The method of claim 1, wherein said shaped permanent magnets of $RECo_5$ are formed by sintering a powder of an alloy of the formula $RECo_5$.

3. The method of claim 1, wherein said foil is composed of silver or copper.

4. The method of claim 3, wherein said foil is aligned between said shaped permanent magnets so that the edges of said foil extend at least 2 millimeters beyond the edges of said surfaces intended to be joined.

5. The method of claim 1, wherein a workpiece is formed by positioning at least two shaped permanent magnets on opposing sides of a solder foil, inserting said workpiece into a holder which is enclosed into a permeable crucible, introducing said crucible into a cooling zone of a furnace having a non-oxidizing atmosphere, passing said crucible into a heating zone which heats the contents of said crucible to no higher than the melting temperature of said solder foil and thereafter cooling said crucible in a second cooling zone which contains a non-oxidizing atmosphere.

6. The method of claim 1, wherein said shaped permanent magnets are formed by sintering a powder of an alloy of the formula $RECo_5$ wherein RE is at least one metal selected from the group consisting of Ln, Cs, rare-earth metals, alloys thereof and misch metal.

7. The method of claim 1, wherein said non-oxidizing atmosphere is an atmosphere of hydrogen, helium or argon.

8. The method of claim 1, wherein said non-oxidizing atmosphere is a vacuum.

9. The method of claim 1, wherein said melt temperature is between the melting temperature of said solder foil and 100°C lower than said melting temperature.

10. A permanent magnet assembly made by the method of claim 1.

* * * * *

UNITED STATES PATENT AND TRADEMARK OFFICE
CERTIFICATE OF CORRECTION

PATENT NO. : 3,923,232
DATED : December 2, 1975
INVENTOR(S) : JAROSLAW HOUSKA and JAN STREJCEK It is certified that error appears in the above-identified patent and that said Letters Patent are hereby corrected as shown below:

Page 1, under [30] Foreign Application Priority Data, delete

"Sweden. . . . . . . . .739489"

and insert

--Switzerland. . . . . .9489/73--.

Signed and Sealed this eighteenth Day of May 1976

[SEAL]

Attest:

RUTH C. MASON
Attesting Officer

C. MARSHALL DANN
Commissioner of Patents and Trademarks